United States Patent
Ostrowski

[15] 3,659,457
[45] May 2, 1972

[54] REGISTER BOX AND LID FOR METERS
[72] Inventor: Anthony C. Ostrowski, Feasterville, Pa.
[73] Assignee: Hersey Products Inc., Dedham, Mass.
[22] Filed: Nov. 17, 1970
[21] Appl. No.: 90,351

[52] U.S. Cl. ..............................73/273, 73/431, 116/129 R, 324/156, 58/91
[51] Int. Cl..................G01p 1/02, G01f 15/14, G04b 39/00
[58] Field of Search ..........................73/272, 273, 334, 431; 317/105–107; 58/91, 104, 105; 324/156; 116/129; 156/293; 161/42, 44, 45, 117, 118, 183; 235/100

[56] References Cited

UNITED STATES PATENTS 2,612,132  9/1952  Triplett..................................116/114
2,738,672  3/1956  Smith et al...........................73/431 X

FOREIGN PATENTS OR APPLICATIONS 140,663  4/1920  United Kingdom........................58/91

Primary Examiner—Richard C. Queisser
Assistant Examiner—C. E. Snee, II
Attorney—Marshall J. Breen, Chester A. Williams, Jr. and Harold Weinstein

[57] ABSTRACT

A register box for a meter formed of a clear plastic which has a recessed face portion into which a glass plate is placed upon seating means in said recess, and affixed therein by a resilient adhesive which provides a floating support for the glass plate, whereby the surface of the register box through which readings are taken is protected and rendered scratch resistant.

6 Claims, 9 Drawing Figures

PATENTED MAY 2 1972
3,659,457
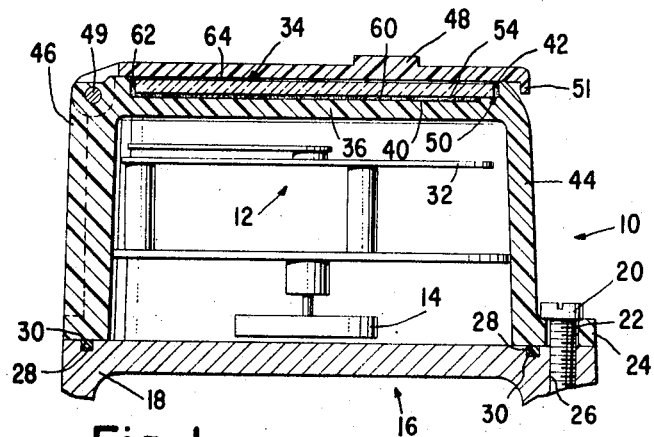
Fig. 1
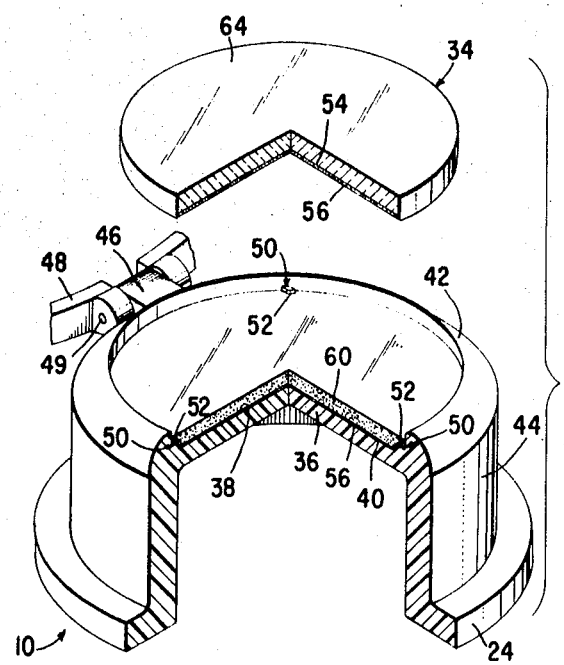
Fig. 2
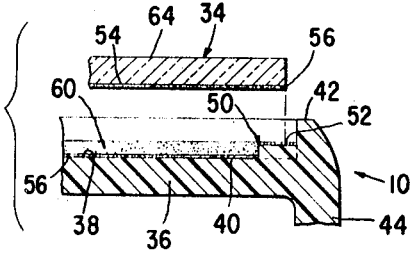
Fig. 9
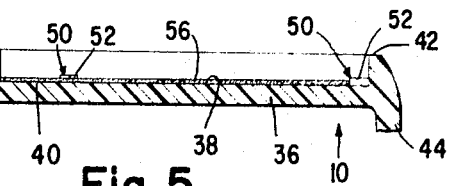
Fig. 3
Fig. 4
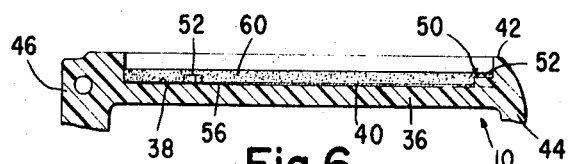
Fig. 5
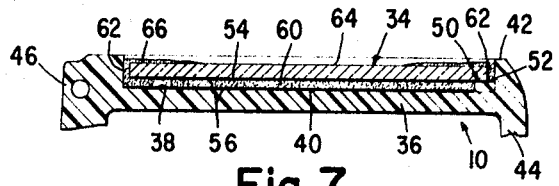
Fig. 6
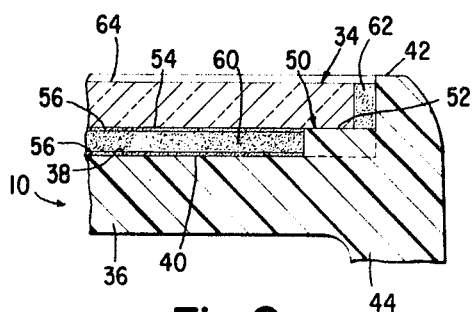
Fig. 7
Fig. 8
INVENTOR.
Anthony C. Ostrowski
BY Harold Weinstein
ATTORNEY
WITNESS:
Patrick McDonnell

REGISTER BOX AND LID FOR METERS

BACKGROUND OF THE INVENTION

Heretofore, the register boxes had open face portions which were covered by glass held in place by retaining rings or sheet metal shrouds and sealed by means of rubber gaskets squeezed in place against the glass. The glass covered open face portion had problems of moisture leakage and glass breakage. Other types of register boxes used a closed face portion, which if a protective lens were not used, would be easily scratched to make accurate readings therethrough, either difficult or impossible. If a protective lens were used in the case of the closed face portion of a plastic register box, the connection was a mechanical one which also encountered sealing problems that permitted moisture to build up and eventual condensation to form on the protective lens, thereby making reading therethrough impossible.

SUMMARY OF THE INVENTION

It is therefore an object of the present invention to provide an improved register box and lid for meters which overcomes the prior art disadvantages; which is simple, economical and reliable; which uses a clear, high impact resistant plastic having a face portion to which a glass plate is laminated by a resilient adhesive; which uses a protective glass plate resiliently affixed to the face portion of the register box by an adhesive which provides a floating support therefor; which is leakproof; which uses a feeding means to initially position the glass plate over the pool of adhesive; which uses a protective ridge formed on the register box about the glass plate to prevent accidental breakage of said plate; and which uses a glass plate of small enough connections so as to permit excess adhesive to pass above the glass plate for subsequent removal.

Other objects and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is an elevational view, partly in section, of a meter including the improved register box embodying the present invention.

FIG. 2 is an exploded perspective, partially broken away, of the improved register box of the present invention.

FIG. 3 is a sectional view of the glass plate.

FIG. 4 is a sectional view of the glass plate shown in FIG. 3 in which a primer coating has been applied to the under surface thereof.

FIG. 5 is a sectional view of the recessed face portion of the register box to which a primer coating has been applied to the bottom surface thereof.

FIG. 6 is a sectional view of the recessed face portion of the register box of FIG. 5 after being filled with a pool of adhesive.

FIG. 7 is a sectional view of the improved register box after the glass plate has been seated in position in the recess so as to float on the pool of adhesive, with the excess adhesive rising above the same for subsequent removal.

FIG. 8 is a greatly enlarged sectional view, partly broken away showing the glass plate in a fixed position.

FIG. 9 is a sectional view, partly broken away, and exploded to show the glass plate prior to seating within the recessed face portion of the register box.

DESCRIPTION OF THE INVENTION

One of the principle purposes of the present invention is to provide a more reliable enclosure for the meter register mechanism by preventing moisture and other environmental contaminants from entering the register box, especially in the area of the face portion thereof, while permitting easy reading of the register face.

In the embodiment of the invention illustrated in FIG. 1, a register box 10 which has mounted therein a conventional register mechanism 12, shown schematically, and driven by a magnetic drive 14 powered by the fluid meter designated generally 16 from a magnetic coupling (not shown) and any other conventional and well-known meter mechanisms. The meter 16 has a meter casing 18, to the top of which the register box 10 is connected by screws 20 circumferentially spaced about and passing through holes 22 formed in the bottom flange 24 of the register box 10. The screws 20 are connected into the threaded holes 26 of the meter casing 18. A gasket 28 is disposed in an annular groove 30 and provides a seal between the register box and the meter casing 18.

The register box 10 as illustrated in FIGS. 1 and 2, has an inverted cup shape, and is formed of a clear, high impact-resistant plastic, such as polycarbonate. The use of polycarbonate for the register box 10 provides many favorable features, but also one unfavorable feature, namely, the face that the polycarbonate material is easily scratched or marred so as to interfere with an operator looking through the register box to take a reading from the register face 32 of the register mechanism 12, which face indicates the fluid throughput flow of the meter 16. One of the principle objects of the present invention is to overcome this shortcoming by laminating a glass plate or lens, designated generally as 34, to the face portion 36 of the register box 10, as more fully set forth hereinafter.

The face portion 26 as shown in FIG. 2, is circular and is formed at the top of the register box 10, so as to be in superposition to the register face 32 of the register mechanism 12. The face portion 36 is transparent and has a circular recess 38 extending from the top surface of the register box 10 to terminate in a flat bottom 40 which corresponds to the upper surface of the face portion 36. An annular ridge 42 is formed about the recess 38 and has an upper edge which lies in a horizontal plane.

An annular side wall 44 is formed between the face portion 36 and the bottom flange 24 so as to completely enclose the register mechanism 12 within the register box 10. A radial rib 46 extends vertically along the side wall 44, to which the rabid ears are pivotally connected by pin 49 at the upper end of rib 46. The lid 48 is circular and has a downturned lip 51 as illustrated in FIG. 1, which extends over the ridge 42 to prevent foreign matter from entering in the area of the face portion 36. The lid 48 will, in the closed position, seat upon the ridge 42. In the closed position shown in FIG. 1, the lid 48 covers the face portion 36 and protects the glass plate 34 from accidental breakage. The lid 48 may be made of the same material, namely clear, high impact-resistant polycarbonate plastic, as that of the register box 10.

The flat bottom 40 of the recess 38 has seating means 50 molded therein in the form of one or more circumferentially spaced steps 52, with three such steps being shown in the drawings of the preferred embodiment of the invention. The steps 52 project vertically upward a short distance from the bottom 40, so as to lie wholly within the recess 38. The steps serve the dual function of initially supporting the glass plate 34, and of maintaining an accurate and consistent clearance between the glass plate 34 and the face portion 36 so as to facilitate lamination of the glass plate or lens 34. The face portion 36 is transparent, but as is the case with other plastic materials having such characteristics, if not protected, would be highly likely to be scratched or marred so as to interfere with the reading of the register face 32.

Of course, the glass plate or lens 34 is transparent and is laminated to the face portion 36 by means of a transparent adhesive of the type which has lifetime resiliency in addition to its transparency. Suitable adhesives are available in the marketplace, such as those based on silicone resins. Depending upon which adhesive is used, a primer can optionally be applied to the surfaces which will contact the adhesive so as to facilitate the laminating process as has been shown in the preferred embodiment of the present invention. The use of a primer is optional, and in the case of certain adhesives may be eliminated.

The steps of laminating the glass plate or lens 34 within the recess 38 are depicted in FIGS. 3 through 9. FIG. 3 shows a cross section of the glass plate 34 in an untreated state, with the underside denoted by reference character 54. In FIG. 4, a thin coating of a suitable primer, generally designated as 56, is applied to the underside 54 of the glass plate 34. The thickness of the primer coat shown in FIGS. 2, 4, 5, 6, 8 and 9, is greatly enlarged so as to be visible, but to the naked eye would not be seen, as is the case in FIGS. 1 and 7. The primer is also applied to the bottom 40 of the recess 38 as is illustrated in FIG. 5.

A suitable clear adhesive 60 is poured into the recess 38 to completely flood the bottom and form a pool thereof at the same height or slightly that of the steps 52, as is shown in FIGS. 6 and 9. Care should be exercised to avoid air entrapment in the adhesive. The glass plate 34 is placed in superposition to the recess 38 as illustrated in FIGS. 2 and 9 in readiness for lamination. Thereafter, the glass plate 34 is lowered to seat upon the steps 52 as shown in FIG. 7. The diameter of the circular recess 38 is larger than the diameter of the circular glass plate 34 so as to form an annular space or passageway 62 between the outer circumference of the glass plate 34 in the inner circumference of the recess 38. The glass plate 34 is placed within the recess 38 so as to provide a substantially uniform annular space 62 about its outer circumference. In seating the glass plate 34 upon the steps 52, it is allowed to "float" down into the adhesive 60, forcing the adhesive 60 to rise in the space 62 with any excess spilling over upon the top side 64 of the glass plate 34. Care must be taken to prevent air entrapment between the underside 54 of the glass plate 34 and the pool of adhesive 60, as by tilting either or both the register box 10 and the glass plate 34 during the seating operation. The glass plate 34 is permitted to settle down into the adhesive 60 until it seats upon the steps 52 as is shown in FIG. 7. Depending on which adhesive is used the time and temperature of curing thereof, so that the adhesive characteristics change from that of a liquid to that of a jell, will depend on the specific adhesive used and it is suggested that the adhesive manufacturer's instructions be followed in this area.

The excess adhesive, designated generally as 66 and shown in FIG. 7, may be peeled off of the glass plate 34 after the curing operation whereby the upper surface of the glass plate 34 will be clean, and as shown in FIG. 8, slightly below the upper surface of the ridge 42 to greatly minimize accidental cracking or chipping of the glass plate 34 during handling or after installation of the meter 16.

Accordingly, the glass plate 34 is held in place by the transparent adhesive 60 which also keeps foreign particles from entering at the underside 54 within the viewing area of the glass plate 34.

It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention what is claimed herein is:

1. A register assembly for a fluid meter comprising:
   a. a register box sealingly connected to the meter,
   b. a register mechanism mounted in the register box to be operatively driven by the meter and said register mechanism having register face indicating the fluid throughput of the meter,
   c. the register box formed of a clear plastic and having a face portion in superposition to the register face,
   d. a recess formed in the face portion,
   e. a seating means formed within the recess and below the outermost surface of the face portion,
   f. a resilient adhesive of predetermined quantity disposed in the recess, which quantity is sufficient to reach the level of the seating means, and
   g. a glass plate disposed in the recess to rest upon the seating means and have the adhesive substantially contact the entire undersurface thereof, whereby the glass plate will be floatingly supported within the recess at the level of the seat means upon a pool of adhesive.

2. The combination claimed in claim 1 wherein:
   a. the recess having a depth exceeding the combined dimensions of the height of the seat means and the thickness of the glass plate so as to define a ridge on the face portion above the upper surface of the glass plate.

3. The combination claimed in claim 1 wherein:
   a. the seat means includes a plurality of spaced step means projecting upwardly from the bottom of the recess.

4. The combination claimed in claim 3 wherein:
   a. the face portion of the register box is substantially circular,
   b. the recess formed in the face portion is substantially circular,
   c. the step means circumferentially spaced within the recess, and
   d. the glass plate substantially circular and seats upon the step means and the adhesive within the recess.

5. The combination claimed in claim 4 wherein:
   a. the recess of a predetermined diameter, and
   b. the glass plate of a predetermined diameter less than the diameter of the recess to form a space therebetween to permit excess adhesive to pass from underneath the glass plate upon the glass plate seating upon the step means.

6. The combination claimed in claim 1 including:
   a. a primer coat on the surfaces of the recess and glass plate.

* * * * *